(12) United States Patent
Leyre

(10) Patent No.: US 7,624,949 B2
(45) Date of Patent: Dec. 1, 2009

(54) SATELLITE PROVIDED WITH MEANS FOR COUNTERING SOLAR PRESSURE

(75) Inventor: Xavier Leyre, Opio (FR)

(73) Assignee: Thales, Neuilly sur Seine (FR)

( * ) Notice: Subject to any disclaimer, the term of this patent is extended or adjusted under 35 U.S.C. 154(b) by 513 days.

(21) Appl. No.: 11/319,527

(22) Filed: Dec. 29, 2005

(65) Prior Publication Data

US 2006/0243863 A1 Nov. 2, 2006

(30) Foreign Application Priority Data

Dec. 31, 2004 (EP) .................................. 04293179

(51) Int. Cl.
B64G 1/24 (2006.01)
(52) U.S. Cl. ..................................... 244/168
(58) Field of Classification Search ................ 244/168, 244/164, 172.7, 172.8
See application file for complete search history.

(56) References Cited

U.S. PATENT DOCUMENTS

| 5,305,971 | A |   | 4/1994 | Decanini |   |
|---|---|---|---|---|---|
| 5,806,801 | A |   | 9/1998 | Steffy et al. |   |
| 6,164,597 | A | * | 12/2000 | Barker et al. | 244/168 |
| 6,189,835 | B1 | * | 2/2001 | Kaufman | 244/168 |
| 6,481,671 | B1 |   | 11/2002 | Blair |   |
| 2004/0140402 | A1 |   | 7/2004 | Wehner et al. |   |

FOREIGN PATENT DOCUMENTS

EP 0 919 463 A1 6/1999

OTHER PUBLICATIONS

T. Williams et al, "Solar radiation pressure and formation—keeping in highly elliptical orbits," AIAA Astrodynamics Specialist Conference, vol. 1, Oct. 5, 2002, XP008044299.
T. Williams et al, "Uses of solar radiation pressure for satellite formation flight", International Journal of Robust and Nonlinear Control, No. 12, 2002, pp. 163-183, XP002320333.
W. D. Deininger et al, "Formation flying activities and capabilities at Ball Aerospace", Aerospace Conference, 2003. proceedings. 2003 IEEE Mar. 8-15, 2003, Piscataway, NJ, USA, IEEE, vol. 6 Mar. 8, 2003, pp. 62599-62614, XP010660555.
L. Vaillon et al, "Precision formation flying design for the Smart-2 and Smart-3 technology demonstration missions", Third International Workshop on Satellite Constellations and Formation Flying, Online! Feb. 24, 2003, pp. 91-99, XP002320334.

* cited by examiner

*Primary Examiner*—Tien Dinh
(74) *Attorney, Agent, or Firm*—Sughrue Mion, PLLC

(57) ABSTRACT

A satellite intended to travel in a constellation of satellites in an area of space in which the dominant disturbing forces and torques are for the most part caused by differential solar pressure between the satellites of the constellation comprises a satellite structure and a sunshield to prevent at least a portion of the satellite structure from being illuminated by solar rays. The reflectivity of the reflective surfaces of the sunshield is adjusted as a function of the angle of incidence of the solar rays.

6 Claims, 2 Drawing Sheets

FIG_1
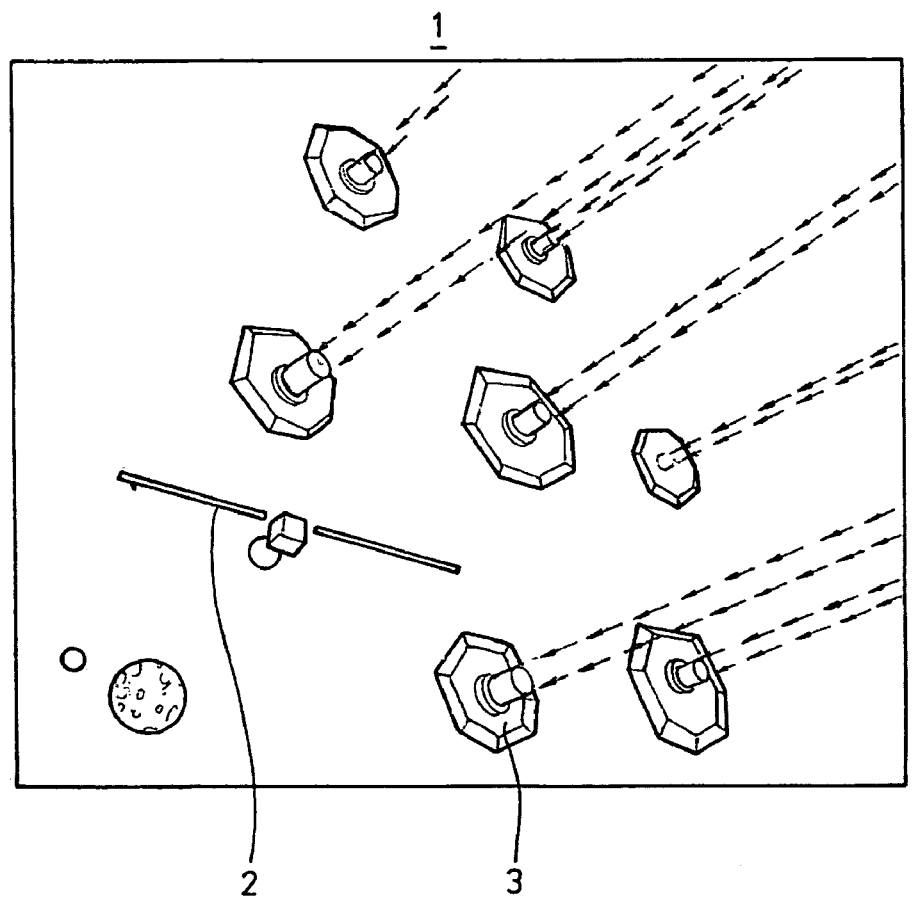

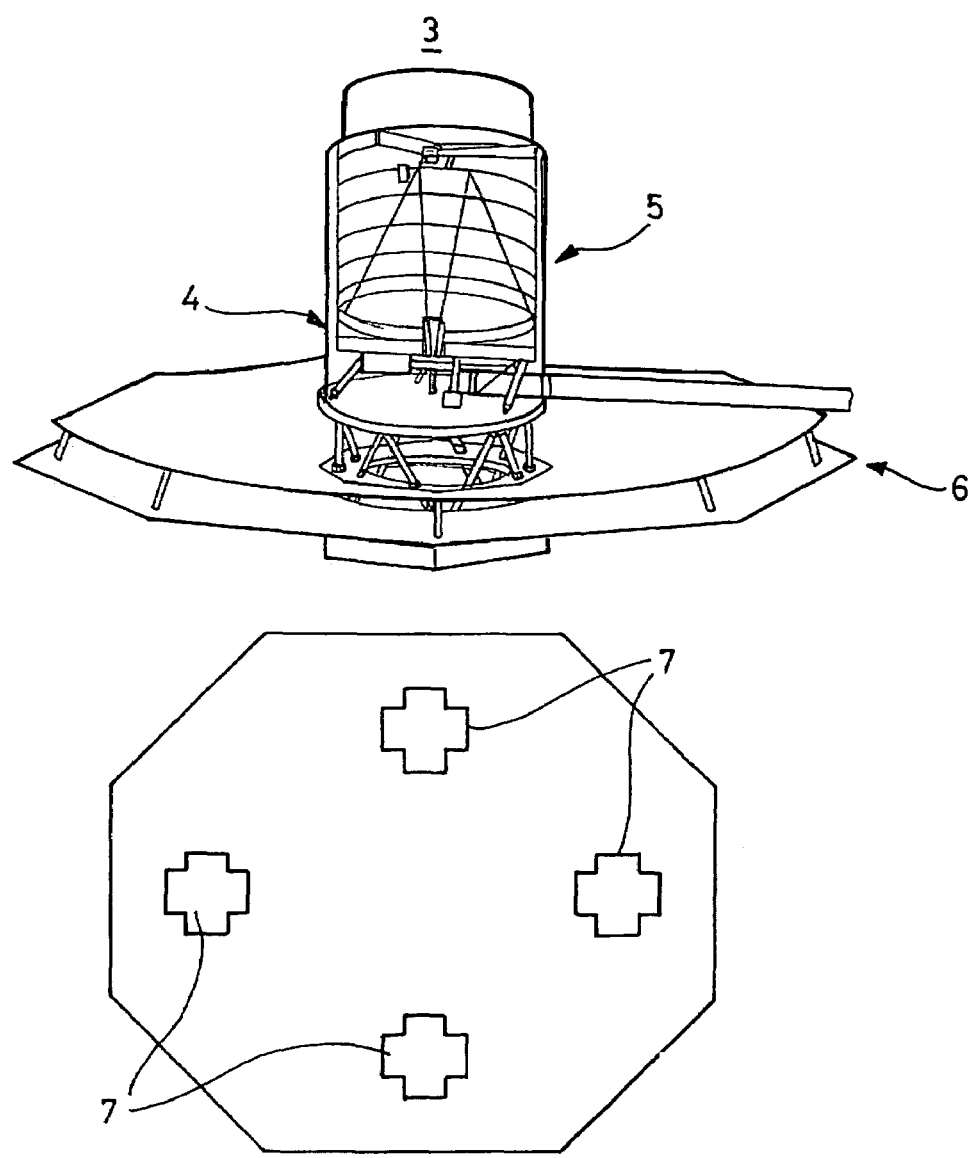
FIG_2

SATELLITE PROVIDED WITH MEANS FOR COUNTERING SOLAR PRESSURE

CROSS-REFERENCE TO RELATED APPLICATIONS

This application is based on French Patent Application No. 04293179.0 filed 31 Dec. 2005, the disclosure of which is hereby incorporated by reference thereto in its entirety, and the priority of which is hereby claimed under 35 U.S.C. §119.

BACKGROUND OF THE INVENTION

1. Field of the Invention

The present invention relates to the field of space and more particularly to one or more spacecraft able to control the solar pressure to which they are subjected by means of a solar sail.

2. Description of the Prior Art

Designs for satellites intended to fly in formation to detect planets outside the solar system are known in the art. These formation flights necessitate a plurality of satellites (typically six satellites) with extremely tight relative positioning demands. Other types of constellations are envisaged in the field of astronomy for synthetic aperture imaging, simulating a mirror with maximum dimensions that correspond to the maximum distance between two satellites (which is typically of the order of several hundred meters). These dimensions are obviously not compatible with the diameters available under the nose-cap of current launch vehicles (typically a few meters) and therefore represent a major technological leap. The orbit for this type of application is generally selected from orbits at the Lagrangian points (typically the L2 point), because of the extremely stable nature of the conditions (thermal, gravitational, radiation) that apply to these orbits, enabling the embarkation of highly sensitive and cooled payloads. In terms of formation flying performance, this implies micrometric or even nanometric accuracy and stability over relatively long time periods (up to a few days).

Controlling formation flying and deploying complex structures in orbit require intersatellite propulsion means (actuators) that are highly accurate (providing a thrust from a few micronewtons to a few millinewtons) at the same time as minimizing accommodation constraints (mass, reliability, no obstruction of the fields of view, no plumes, no pollution of the optics, etc.). In Lagrangian point orbits and orbits sufficiently far from the Earth (typically at distances greater than 100 000 km), the dominant disturbing forces and torques are caused by differential solar pressure between the satellites of the constellation and the torques generated on each satellite. This may also apply to a single satellite under similar conditions.

To satisfy the requirements cited above, the constellation must comprise a certain number of satellites, very accurate metrology subsystems, and propulsion subsystems for countering the solar pressure that are extremely accurate and generate very low levels of noise.

The concepts conventionally adopted to respond to this type of requirement are based on a constellation comprising n identical and autonomous satellites with propulsion based on a system of thrusters distributed over the entire constellation. The type of thruster used ranges from the standard chemical type to ionic thrusters and field electrical effect propulsion (FEEP) thrusters, the latter employing the application of high voltages to molecules of cesium or indium to generate a very high speed thereof for propelling the craft.

However, propulsion control systems using thrusters suffer from a certain number of problems, in particular pollution of the optics, noise, lack of accuracy of the thrusters, generation of plumes, accommodation on the satellite and increased mass, because of the presence of the thrusters.

Moreover, propulsion control systems using coils and wheels suffer from complementary problems, in particular microvibration of the wheels, noise generated by the wheels during operational phases, the service life of the wheels, the impossibility of effecting inertial correction as a function of the intersatellite distance of the constellation.

An object of the invention is therefore to provide a satellite intended to travel in a constellation of satellites in an area of space in which the dominant disturbing forces and torques are for the most part caused by differential solar pressure between said satellites of the constellation, said satellite being able to control its attitude when flying in formation without using thrusters or wheels, very accurately and with minimum induced noise.

SUMMARY OF THE INVENTION

To this end, the invention consists in a satellite intended to travel in a constellation of satellites in an area of space in which the dominant disturbing forces and torques are for the most part caused by differential solar pressure between said satellites of said constellation, said satellite comprising a satellite structure, a sunshield having reflective surfaces and adapted to prevent at least a portion of said satellite structure from being illuminated by solar rays, and means for adjusting the reflectivity of said reflective surfaces of said sunshield as a function of the angle of incidence of said solar rays.

What is innovative about the invention is that, given that the disturbing forces and torques in Lagrangian point orbits or equivalent orbits are for the most part (by several orders of magnitude) caused by solar pressure, the aim is to counter this solar force at source: by controlling the reflectivity of the reflecting surfaces.

In the case of satellites flying in formation, the differential forces exerted between the satellites must be varied to control the satellites.

Accordingly, in one embodiment with a constellation of satellites flying in formation, the dominant force being solar pressure, the means for adjusting the reflectivity of the reflective surfaces of the sunshield equalize the solar pressure/satellite mass ratio for each satellite. Once equalization has been achieved, no further control is necessary, and the residual disturbing differential forces are several orders of magnitude lower (typically <0.1 micronN), so that the satellite can be allowed to drift during imaging.

The principal advantages lie in the elimination of pollution of the optics by thrusters, the elimination of the noise of wheels, the use of conventional chemical thrusters (already present for orbit injection) for orbit correction only and not for operational control of formation flying, and absence of sensitivity to the intersatellite distance, in particular for astronomical missions in L2 orbit where the intersatellite distances can be up to one kilometer.

In one embodiment, to compensate the dominant disturbing torques caused by the differential solar pressure between said satellites of the constellation, the reflective surfaces the reflectivity whereof is adjusted by the adjustment means are arranged symmetrically with respect to the center of thrust of the satellite to enable control about three axes of the satellite.

In one embodiment, the means for adjusting the reflectivity of the reflective surfaces of the sunshield as a function of the angle of incidence of the solar rays consist in Maltese crosses.

In one embodiment, the means for adjusting the reflectivity of the reflective surfaces of the sunshield as a function of the angle of incidence of the solar rays consist in variable reflectivity films the variation whereof is controlled electrically.

Other features and advantages of the invention will become apparent on reading the following detailed description and examining the appended drawings.

BRIEF DESCRIPTION OF THE DRAWINGS

FIG. 1 represents one example of an application in which the invention can be used.

FIG. 2 is a diagram of one embodiment of a satellite of the invention including a view of the side facing the Sun.

DETAILED DESCRIPTION OF THE PREFERRED EMBODIMENT

Hereinafter, items having identical or similar functions carry the same reference numbers.

FIG. 1 represents a constellation 1 comprising a main satellite 2 and secondary satellites 3.

FIG. 2, showing the satellite 3 diagrammatically, will also be referred to hereinafter.

The application example selected for describing the invention is the "Darwin" fleet of the European Space Agency project of the same name. There are shown the main satellite 2, which carries the "intelligence" of the constellation (for which reason it is known as the "hub") and n identical satellites (n=6 in FIG. 1), inertially pointing in a fixed direction for a relatively long time period, typically a few days.

The satellite 3 has, on the face opposite that on which solar rays impinge, a payload 4 that could be reduced to a plane mirror (but which could have any shape) mounted in a simple structure 5 covered with solar cells (not shown). The face of the satellite on which solar rays impinge further comprises a sunshield 6.

The interior of the structure 5 is reduced to the strict minimum, namely a startracker in particular.

The L2 (Lagrangian point) orbit has, in the case of the "Darwin" mission, a main disturbing force consisting of the solar pressure force of approximately 5 microN/m$^2$. Considering, roughly speaking, 100 m$^2$ sunshields and a 2% fabrication dispersion of each shield, an intersatellite differential force of the order of 20 micronN will apply.

In a first embodiment, shown in FIG. 2, the shields include Maltese crosses 7 known in the art.

In an innovative variant (not shown), the shields include a film of variable reflectivity, the variation of which is controlled electrically, this type of film being known in the art.

The Maltese crosses 7, or the variable reflectivity film, are arranged and selected to vary the reflectivity from 0.3 to 0.8, an area on each satellite of the order of 4 to 5 m$^2$ then being more than sufficient to counter the solar force. Residual infrared pressure forces may also be eliminated in the same way.

There will then remain only residual magnetic and RF pressure forces of less than 0.1 microN, which can be controlled directly by dedicated RF emissions, if necessary, or merely ignored.

Where the torques corresponding to the solar pressures are concerned, it is necessary to consider separately the torques about the various axes. Consider first the torques about the axes perpendicular to the normal to the shield 6, with the variable reflectivity areas 7 disposed symmetrically at four points relative to the center of thrust of the shield. Obviously these two axes can be controlled directly. With regard to the third axis (perpendicular to the plane of the shield), which might be referred to as the axis of rotation of the shield, it is necessary to fold the edge of the shield at a certain angle, and differentially between the edges, to cause it to act as a "solar windmill"; by altering the variation of reflectivity at its edges the solar windmill effect can be adjusted or eliminated. Remember that the torques generated by the solar pressure about this axis are very low.

There is claimed:

1. A satellite intended to travel in a constellation of satellites in an area of space in which the dominant disturbing forces and torques are for the most part caused by differential solar pressure between said satellites of said constellation, said satellite comprising a satellite structure, a sunshield having reflective surfaces and adapted to prevent at least a portion of said satellite structure from being illuminated by solar rays, and reflectivity adjustment means for adjusting the reflectivity of said reflective surfaces of said sunshield as a function of the angle of incidence of said solar rays, wherein said reflective surfaces and said reflectivity adjustment means are disposed on the shield symmetrically at four points relative to a center of thrust of the shield.

2. The satellite according to claim 1, wherein said means for adjusting the reflectivity of said reflective surfaces of said sunshield equalize the solar pressure/satellite mass ratio for each satellite.

3. The satellite according to claim 1, wherein said reflective surfaces the reflectivity whereof is adjusted by said adjustment means are arranged symmetrically with respect to a center of thrust of said satellite to enable control about three axes of said satellite.

4. The satellite according to claim 1, wherein said means for adjusting the reflectivity of said reflective surfaces of said sunshield as a function of said angle of incidence of said solar rays comprise variable reflectivity films the variation whereof is controlled electrically.

5. The satellite according to claim 1, wherein said reflectivity adjustment means comprise Maltese cross shaped devices.

6. The satellite according to claim 1, wherein said reflectivity adjustment means are arranged and selected to vary said reflectivity from 0.3 to 0.8.

* * * * *